US012736018B2

(12) United States Patent
Moreno et al.

(10) Patent No.: US 12,736,018 B2
(45) Date of Patent: Sep. 15, 2026

(54) TWO-STAGE FUEL TANK ISOLATION VALVE WITH INTEGRATED PRESSURE RELIEF

(71) Applicant: PHINIA Jersey Holdings LLC, Wilmington, DE (US)

(72) Inventors: Alejandro Moreno, El Paso, TX (US); Aldo Darien Venegas Carrillo, Ciudad Juarez (MX)

(73) Assignee: PHINIA Jersey Holdings LLC, Wilmington, DE (US)

( * ) Notice: Subject to any disclaimer, the term of this patent is extended or adjusted under 35 U.S.C. 154(b) by 0 days.

(21) Appl. No.: 18/985,700

(22) Filed: Dec. 18, 2024

(65) Prior Publication Data

US 2026/0168469 A1 Jun. 18, 2026

(51) Int. Cl.
*F02M 25/08* (2006.01)

(52) U.S. Cl.
CPC .... *F02M 25/0836* (2013.01); *F02M 25/0854* (2013.01); *F02M 2025/0845* (2013.01)

(58) Field of Classification Search
CPC .................. F02M 25/0836; F02M 2025/0845
See application file for complete search history.

(56) References Cited

U.S. PATENT DOCUMENTS 10,717,354 B2 7/2020 Bhandari et al.
10,850,609 B2 12/2020 Vulkan et al.
11,988,301 B2 5/2024 McLauchlan et al.
11,999,225 B2 6/2024 McLauchlan et al.
2006/0185735 A1* 8/2006 Tsuge ................ F02M 25/0836 137/495
2012/0138610 A1* 6/2012 Lee .................. B60K 15/03519 220/89.1
2013/0298880 A1 11/2013 Pifer et al.
2016/0123490 A1* 5/2016 McLauchlan ...... F02M 25/0836 137/15.18
2019/0084410 A1* 3/2019 Bhandari ........... F02M 25/0836
2021/0348582 A1* 11/2021 Hill .................. B60K 15/03519
2022/0034419 A1* 2/2022 Kim .................... F16K 31/0655
2023/0008621 A1 1/2023 Long et al.
2023/0085374 A1 3/2023 Lee
2023/0213105 A1 7/2023 Bhandari et al.

FOREIGN PATENT DOCUMENTS

CN 107084267 B 4/2019

* cited by examiner

*Primary Examiner* — Reinaldo Sanchez-Medina
(74) *Attorney, Agent, or Firm* — WARNER NORCROSS + JUDD LLP

(57) ABSTRACT

A fuel tank isolation valve is provided. The valve includes a valve member disposed within a valve chamber defined by a housing. The valve member is mounted on an alignment pin of a moveable plunger of a solenoid assembly. The valve member includes a first stage valve surface and an opposite second stage valve surface. In a closed disposition, the first stage valve surface is seated on a surface of the moveable plunger, and the second stage valve surface is seated on an inner surface of the housing. In a first stage open disposition, the first stage valve surface of the valve member is unseated from the moveable plunger while the second stage valve surface remains seated. In a second stage open disposition, the second stage valve surface is unseated from the inner surface while the first stage valve surface becomes seated on the surface of the moveable plunger.

19 Claims, 14 Drawing Sheets

TWO-STAGE FUEL TANK ISOLATION VALVE WITH INTEGRATED PRESSURE RELIEF

FIELD OF THE INVENTION

The disclosure generally relates to evaporative emissions canisters and evaporative emission control systems and, more specifically, to fuel tank isolation valves for control of evaporative emissions.

BACKGROUND OF THE INVENTION

Evaporative loss of fuel vapor generated within fuel tanks of the fuel systems of motor vehicles powered at least in part by internal combustion engines is a potential contributor to atmospheric air pollution by hydrocarbons. Canister systems that employ activated carbon to adsorb the fuel vapor emitted from the fuel systems are used to limit such evaporative emissions from the fuel tanks of gasoline-fueled automotive vehicles during refueling and diurnal temperature changes. Hybrid vehicles such as plug-in hybrid vehicles (PHEV) that are powered by both electrically driven motors operating using stored electric energy as well as gasoline-fueled internal combustion engines provide additional challenges due to intermittent operation of the internal combustion engine and the need to store pressurized fuel in the fuel tank when a hybrid vehicle is operating in the electric mode and the engine is off. Such hybrid vehicles therefore utilize a direct current valve commonly known as a fuel tank isolation valve that is located along a vapor conduit between the fuel tank and the fuel vapor canister in order to isolate the fuel tank from the canister. The fuel tank is upstream from the fuel tank isolation valve and the fuel vapor canister is downstream from the fuel tank isolation valve along the vapor flow path, and thus in a closed disposition the fuel tank isolation valve seals the fuel tank.

A fuel tank isolation valve regulates the fuel tank pressure during all of a hybrid vehicle's operating conditions. The fuel tank isolation valve is closed when it is not energized and therefore stays closed until a voltage signal is applied to the valve. When a hybrid vehicle is operating in the electric mode, the fuel tank isolation valve is de-energized so that the fuel tank is sealed closed. In this condition, the fuel tank isolation valve maintains the vapor pressure inside the fuel tank in a protected pressure range by reacting to over-pressure and under-pressure conditions in the fuel tank. The over-pressure condition may occur when the ambient temperature increases causing the vapor pressure to increase, and the under-pressure condition may occur when the ambient temperature decreases such as when the vehicle is parked, causing the vapor pressure to decrease and creating a vacuum within the fuel tank. The fuel tank isolation valve includes an internal bypass or pressure relief mechanism that opens to maintain the tank pressure within the desired range, either allowing fuel vapors to travel from the fuel tank to the canister in the over-pressure condition or fuel vapors to travel from the canister to the fuel tank in the under-pressure (over-vacuum) condition. When the hybrid vehicle is being refueled, the fuel tank isolation valve is opened by a direct voltage signal sent to the valve. Opening of the fuel tank isolation valve allows fuel vapors to travel from the fuel tank into the fuel vapor canister to prevent the fuel vapors from backing out of the fuel tank and being released into the atmosphere and to prevent back-pressure from letting the fuel tank become completely filled. The fuel tank isolation valve thereby avoids the release of fuel vapors to the external environment when the fuel tank is pressurized, and helps to control fuel vapor emission when the vehicle is driven in the electric mode and/or when the fuel vapor canister is saturated.

A continued need exists, however, for a fuel tank isolation valve that provides any one of the advantages of having lower production cost, reduced size, lower weight, improved performance, and lower power consumption.

BRIEF SUMMARY

An improved fuel tank isolation valve is provided. The fuel tank isolation valve includes a housing having an outer wall defining an internal valve chamber therein, and a transfer passage formed in a portion of the outer wall. A tank port is connected to the housing. A canister port is also connected to the housing. The tank port is in selective fluid communication with the canister port via the valve chamber and transfer passage. A solenoid assembly is connected to the housing. The solenoid assembly includes: a stationary core; a moveable plunger having a first end and a second end longitudinally opposed to the first end, the first end being adjacent the stationary core; a coil that encircles the stationary core and the moveable plunger, the coil actuating the moveable plunger; a primary spring disposed between the stationary core and the moveable plunger; and an alignment pin extending from the second end of the moveable plunger. A valve member is disposed in the valve chamber. The valve member is mounted on the alignment pin. The valve member includes a first stage valve surface and an opposite second stage valve surface. The first stage valve surface is seated on an end surface of the moveable plunger at the second end in a closed disposition. The second stage valve surface is seated on an inner surface of the wall of the housing in a closed disposition, the inner surface of the wall surrounding the transfer passage. A secondary spring is engaged with the valve member opposite the moveable plunger.

In specific embodiments, the fuel tank isolation valve further includes a pedestal extending from a surface of the canister port. The secondary spring is seated on the pedestal such that the secondary spring is disposed between the valve member and the pedestal.

In specific embodiments, the fuel tank isolation valve further includes a retainer mounted on the alignment pin. The secondary spring is retained by the retainer such that the secondary spring is disposed between the valve member and the retainer.

In specific embodiments, the valve member includes a generally tubular main body having a first portion connected to a second portion by a shoulder, the first portion terminating in an annular rim defining the first stage valve surface, and the second portion terminating in an opposite annular rim defining the second stage valve surface.

In particular embodiments, an inner shoulder surface of the main body defines an internal spring seat, and the secondary spring is seated on the internal spring seat.

In particular embodiments, the first portion of the main body has a smaller diameter than the second portion of the main body.

In particular embodiments, the valve member includes a tubular guide portion connected to an inner surface of the main body adjacent the shoulder. The alignment pin extends through the guide portion.

In particular embodiments, the valve member includes one or more fins extending from the shoulder and beyond the annular rim of the first portion of the main body.

In certain embodiments, the one or more fins overlap a portion of the moveable plunger.

In certain embodiments, the valve member includes a plurality of fins circumferentially disposed and spaced around the first portion of the main body.

In particular embodiments, the fuel tank isolation valve further includes a first sealing ring on the annular rim defining the first stage valve surface, and a second sealing ring on the opposite annular rim defining the second stage valve surface.

In specific embodiments, the fuel tank isolation valve further includes a pressure relief chamber, and a pressure relief valve disposed in the pressure relief chamber.

In particular embodiments, the fuel tank isolation valve further includes a first relief passage connecting the valve chamber and the pressure relief chamber, and a relief valve seat surrounding the first relief passage. The pressure relief valve includes a poppet seated on the relief valve seat in a closed disposition.

In certain embodiments, the fuel tank isolation valve further includes a second relief passage connecting the pressure relief chamber and the canister port. The tank port and the valve chamber are in fluid communication with the canister port via the first relief passage, the pressure relief chamber, and the second relief passage in an open disposition of the pressure relief valve.

In specific embodiments, the valve member is operable between the closed disposition, a first stage open disposition, and a second stage open disposition. Activation of the coil draws the moveable plunger toward the stationary core and unseats the first stage valve surface of the valve member from the moveable plunger while the second stage valve surface remains seated. Maintained activation of the coil draws the moveable plunger closer to the stationary core and unseats the second stage valve surface while the first stage valve surface becomes seated on the moveable plunger.

In specific embodiments, in a first stage open disposition of the fuel tank isolation valve, the valve has a fuel vapor flow path from the tank port into the valve chamber, past the first stage valve surface of the valve member, through the valve member and transfer passage, and into the canister port.

In specific embodiments, in a second stage open disposition of the fuel tank isolation valve, the valve has a fuel vapor flow path from the tank port into the valve chamber, past the second stage valve surface of the valve member, and through the transfer passage into the canister port.

A method of operating a fuel tank isolation valve is also provided. The method includes the step of providing a fuel tank isolation valve according to any of the embodiments described above. The method further includes applying a control voltage to the coil of the solenoid assembly, wherein the valve member moves from a closed disposition to a first stage open disposition such that the moveable plunger is drawn toward the stationary core and unseats the first stage valve surface of the valve member from the moveable plunger while the second stage valve surface remains seated. The method further includes maintaining application of the control voltage to the coil of the solenoid assembly, wherein the valve member moves from the first stage open disposition to a second stage open disposition such that the moveable plunger is drawn closer to the stationary core and unseats the second stage valve surface while the first stage valve surface becomes seated on the moveable plunger.

An evaporative emission control system for a vehicle is also provided. The system includes a fuel tank, an evaporative emissions canister; and a fuel tank isolation valve according to any of the embodiments described above. The fuel tank isolation valve is connected between the fuel tank and the evaporative emissions canister.

DESCRIPTION OF THE DRAWINGS

Various advantages and aspects of this disclosure may be understood in view of the following detailed description when considered in connection with the accompanying drawings, wherein.

DETAILED DESCRIPTION OF THE INVENTION

A fuel tank isolation valve for a fuel system is provided. Referring to FIGS. 1-15, wherein like numerals indicate corresponding parts throughout the several views, the fuel tank isolation valve is illustrated and generally designated as 20. The fuel tank isolation valve 20 is a two port, three position valve that provides for one or more of a reduction in force required to open the valve, a reduction in coil and solenoid size, a reduction in the number of valve components, and a reduction in cost.

Figure 1:
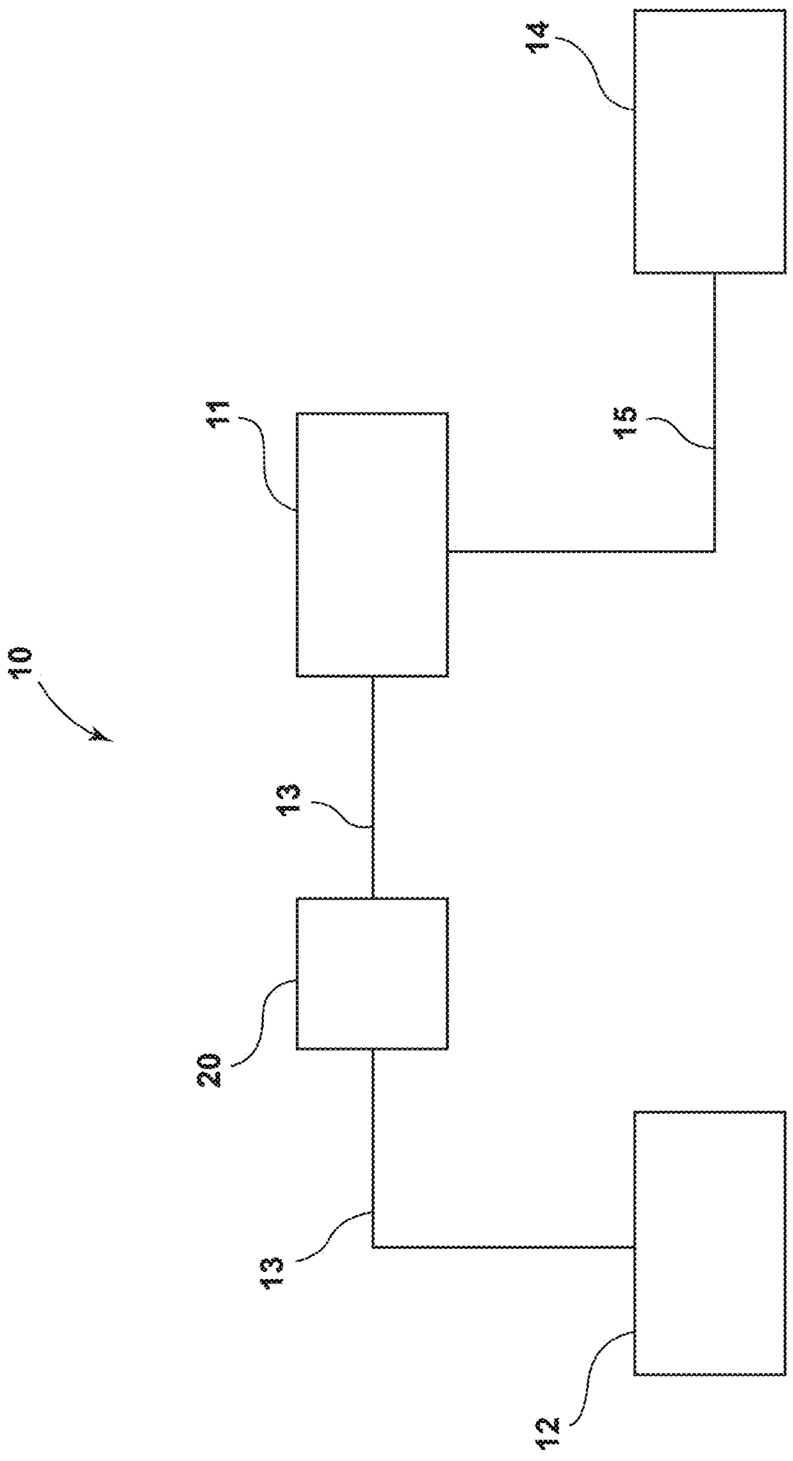
FIG. 1 is a schematic view of an evaporative emissions control system including a fuel tank isolation valve in accordance with various embodiments of the disclosure.
Figure 2:
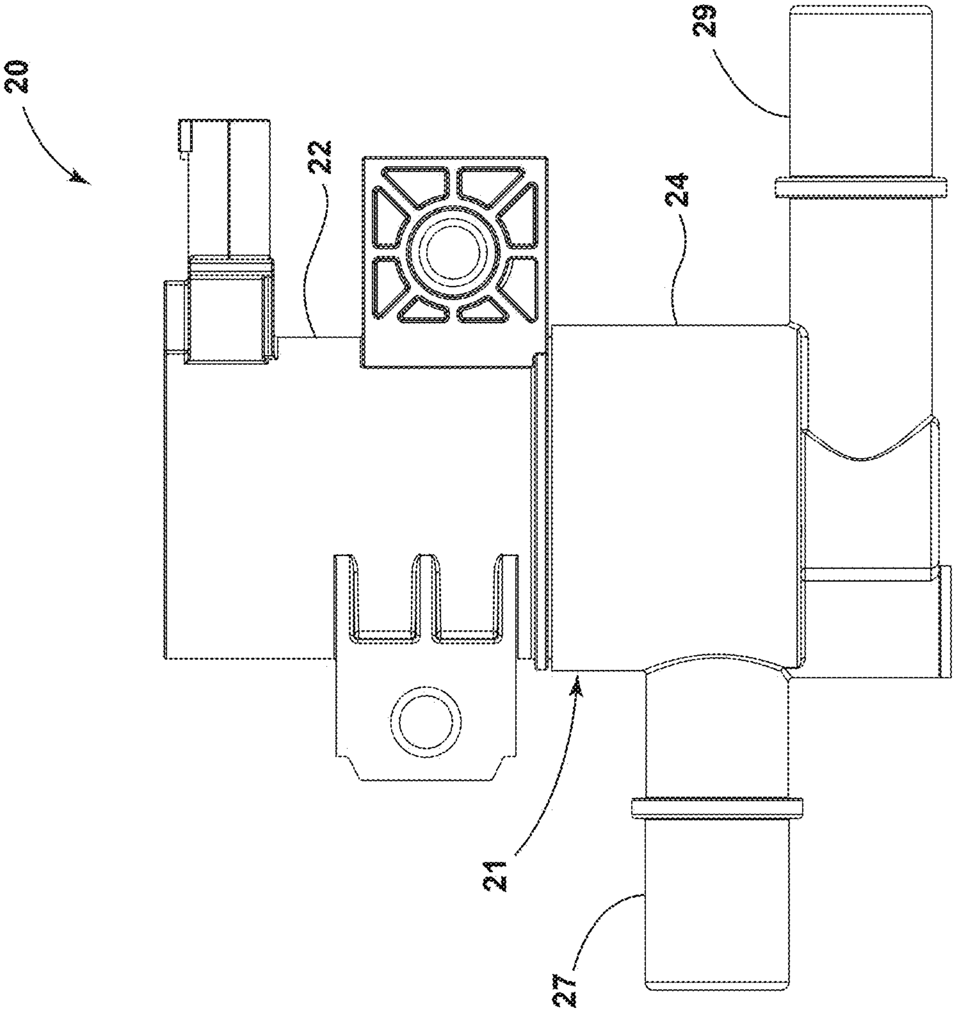
FIG. 2 is a side view of the fuel tank isolation valve in accordance with some embodiments of the disclosure.
Figure 3:
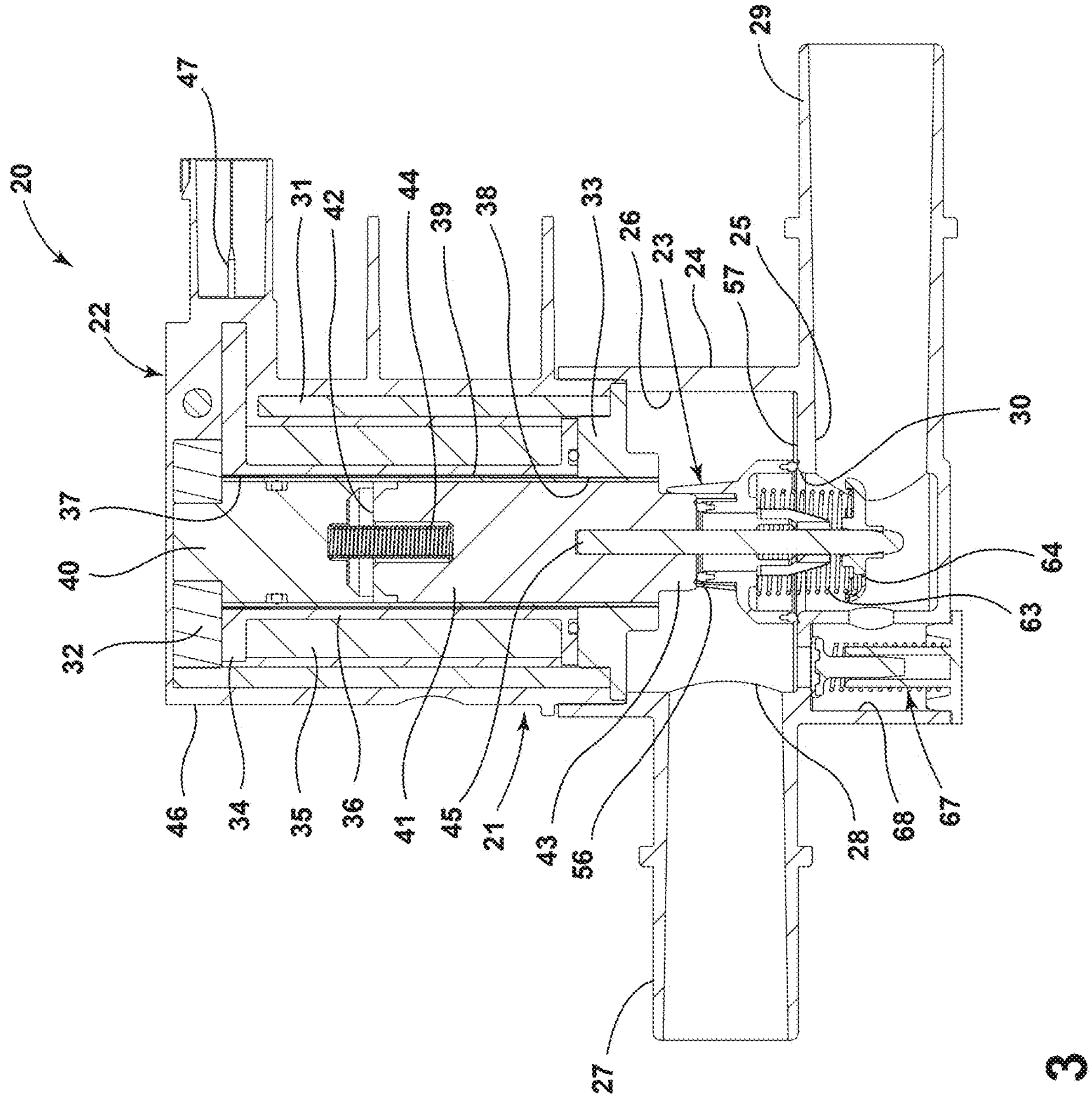
FIG. 3 is a sectional view of the fuel tank isolation valve of FIG. 2.
Figure 4:
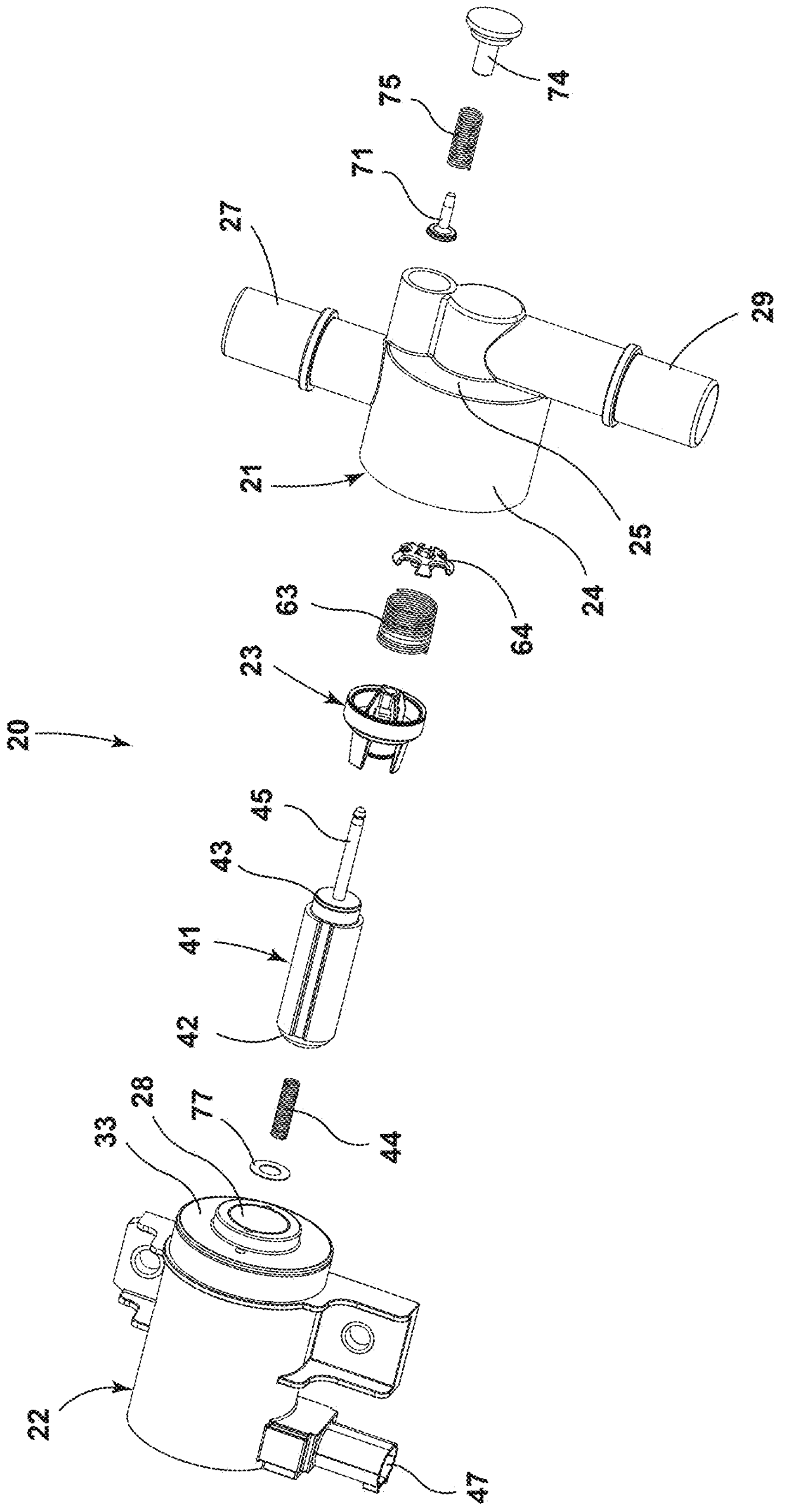
FIG. 4 is an exploded view of the fuel tank isolation valve of FIG. 2.
Figure 5:
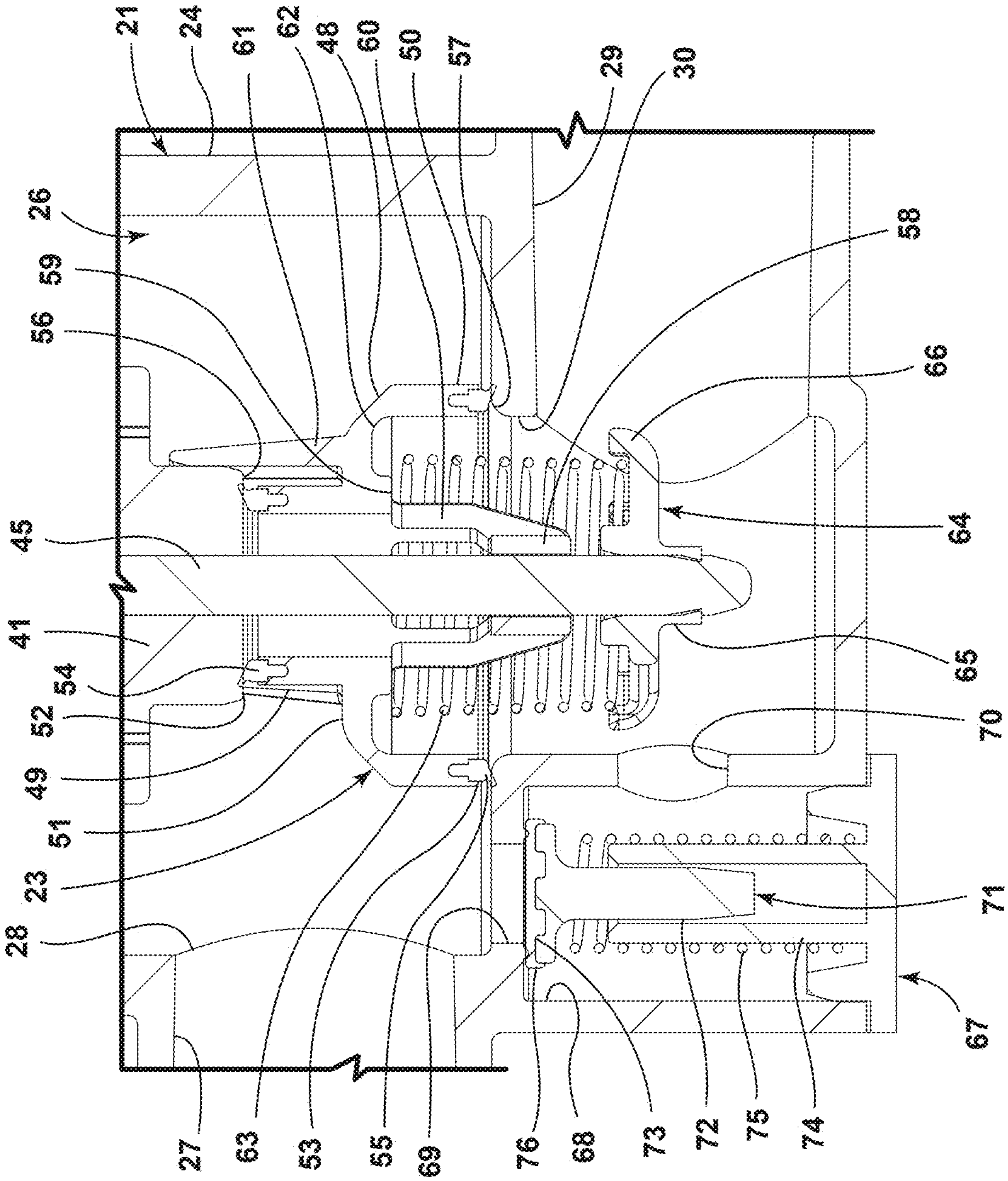
FIG. 5 is an enlarged portion of the sectional view of the fuel tank isolation valve in FIG. 3.
Figure 6:
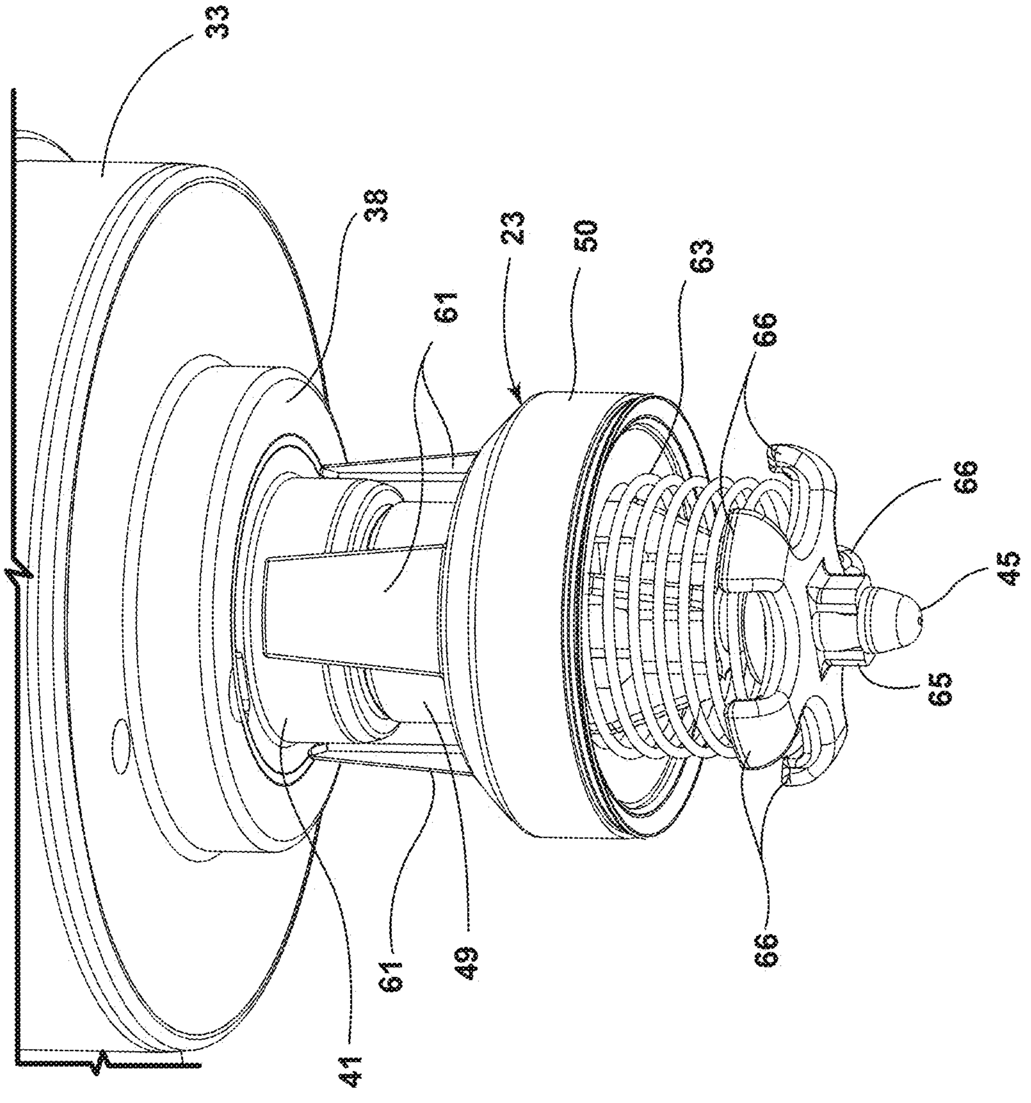
FIG. 6 is a perspective view of an internal portion of the fuel tank isolation valve of FIG. 2.
Figure 7:
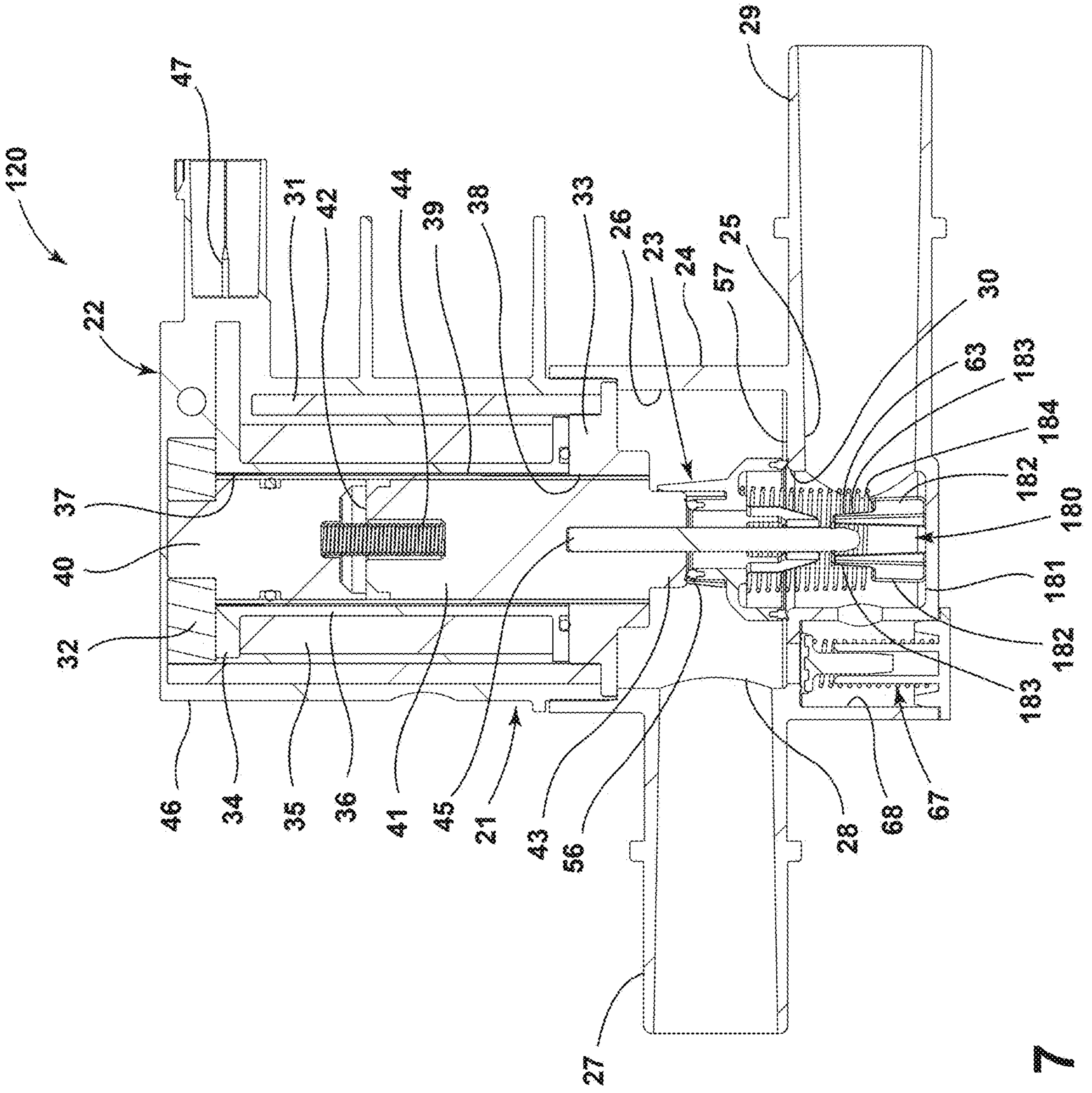
FIG. 7 is a sectional view of a fuel tank isolation valve in accordance with other embodiments of the disclosure.
Figure 8:
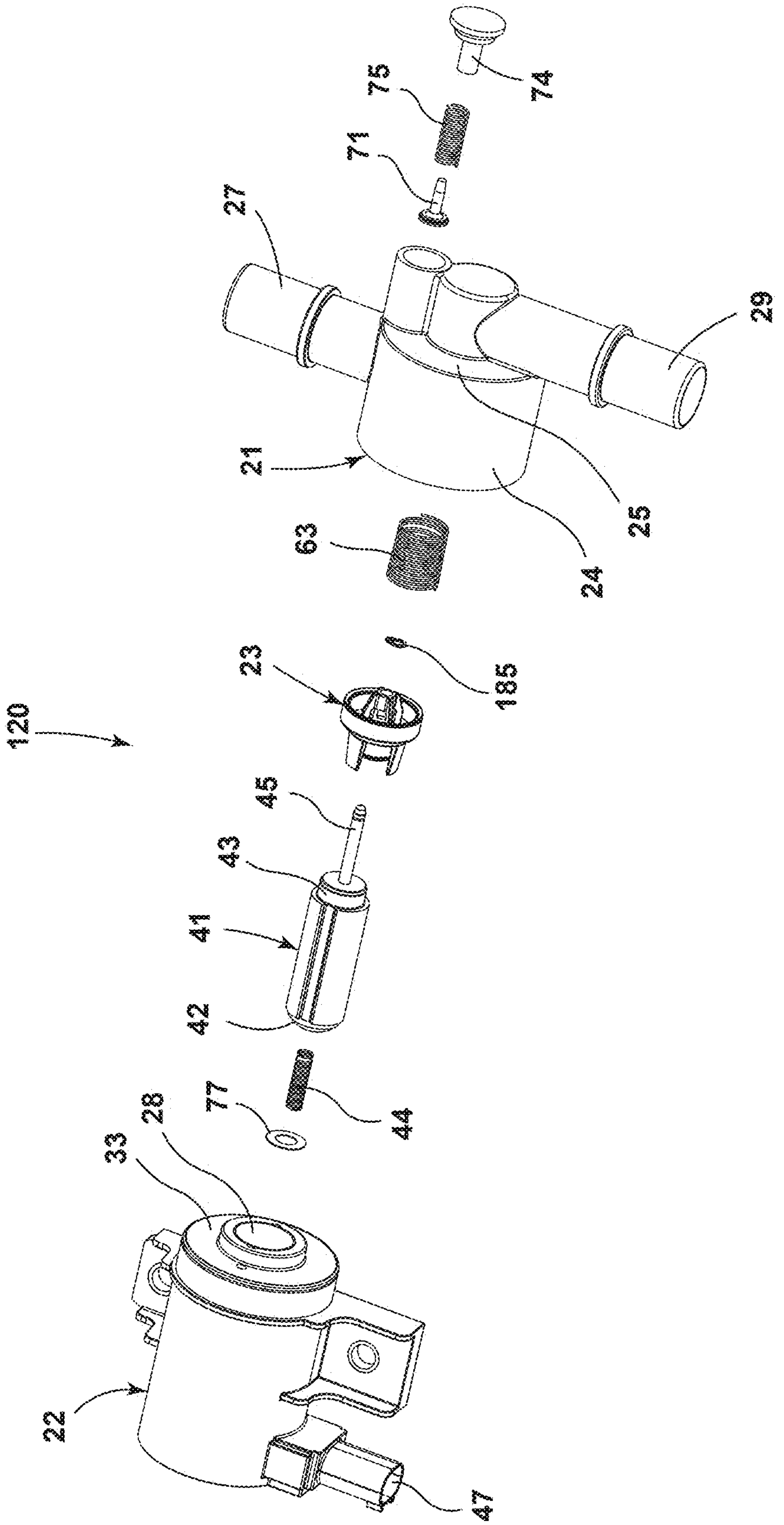
FIG. 8 is an exploded view of the fuel tank isolation valve of FIG. 7.
Figure 9:
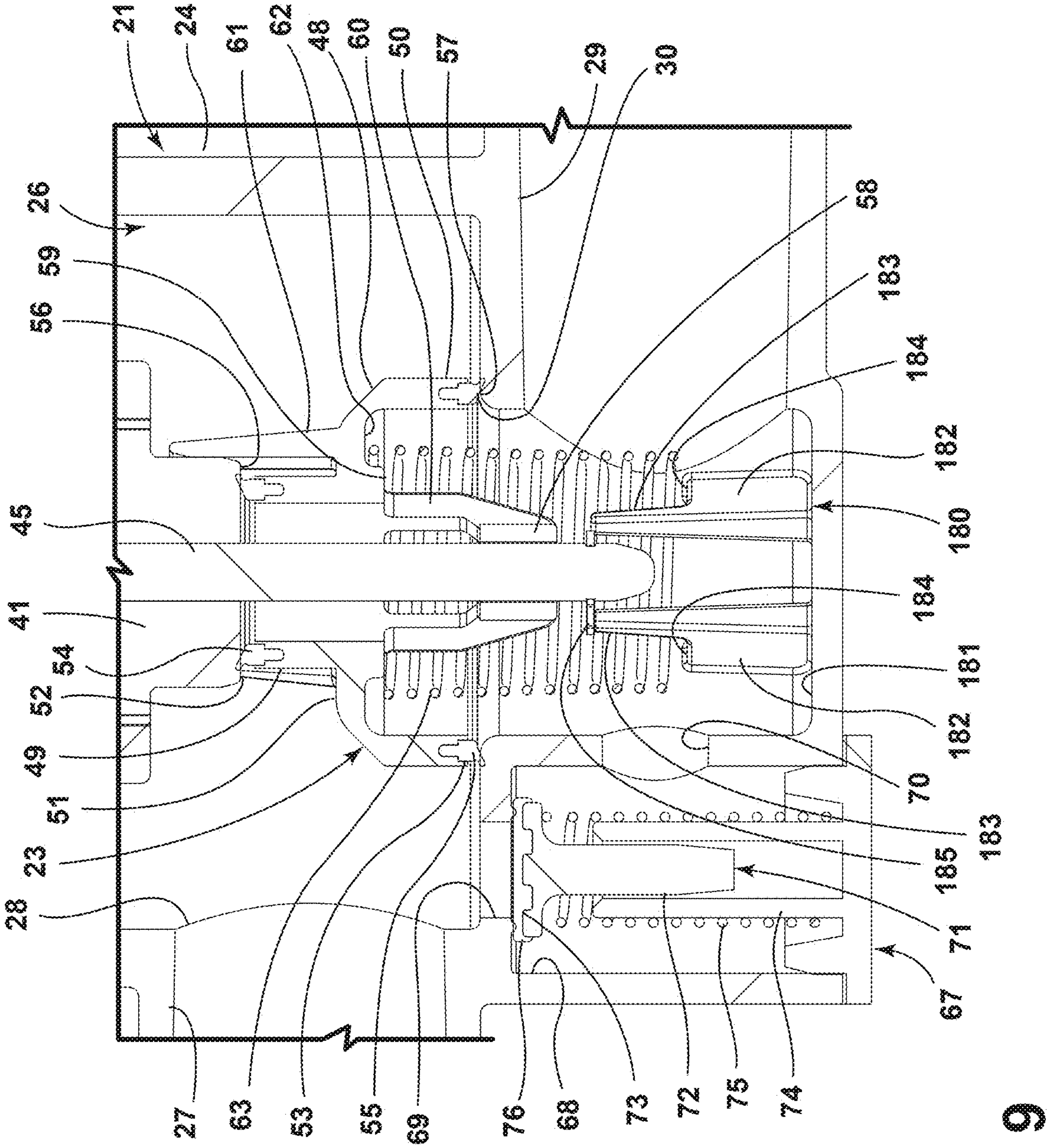
FIG. 9 is an enlarged portion of the sectional view of the fuel tank isolation valve in FIG. 7.

With reference first to FIG. 1, an evaporative emission control system 10 for a vehicle fuel system generally includes an evaporative emissions canister 11 connected to and in fluid communication with a fuel tank 12 by a fuel vapor line 13 in the form of a tube, pipe, or other similar conduit. The evaporative emissions canister 11, also known as a fuel vapor canister, contains an absorbent such as an activated carbon material or similar that adsorbs fuel vapors generated and/or contained in the fuel tank 12. The evaporative emissions canister 11 is not particularly limited and may be any suitable evaporative emissions canister as known in the art. The fuel tank 12 is also not particularly limited and may be any storage container suitable for storing a supply of fuel as known in the art. The evaporative emissions canister 11 is connected downstream to and in fluid communication with an air intake system of an internal combustion engine 14 of the vehicle by a purge line 15 in the form of a tube, pipe, or other similar conduit. The purge line 15 allows for purging of fuel vapors collected in the evaporative emissions canister 11 from the fuel tank 12 for consumption during the combustion process in the engine 14. The internal combustion engine is not particularly limited and may be any internal combustion engine as known in the art. In certain vehicles, such as hybrid electric vehicles that include both an electric motor driven by battery-stored power and an internal combustion engine operated by burning fuel such as gasoline, a fuel tank isolation valve such as the fuel tank isolation valve 20 is connected to the fuel vapor line 13 between the fuel tank 12 and the evaporative emissions canister 11. The fuel tank isolation valve 20 is in fluid (fuel vapor) communication with both the fuel tank 12 and the evaporative emissions canister 11 via the fuel vapor line 13, with the fuel tank isolation valve 20 being downstream from the fuel tank 12 along a fuel vapor pathway formed by the vapor line 13 and upstream from the evaporative emissions canister 11 along the fuel vapor pathway.

With reference next to FIGS. 2-6, in some exemplary embodiments the fuel tank isolation valve 20 includes a housing 21, a solenoid assembly 22, and a valve member 23. The housing 21 has outer walls 24, 25 that define an internal valve chamber 26 within the housing 21. A tank port 27 is connected to the housing 21 and is in fluid communication with the valve chamber 26 through an opening 28 in the wall 24. A canister port 29 is also connected to the housing 21 and is in fluid communication with the valve chamber 26 through a transfer passage opening 30 formed in the wall 25 of the housing 21. The canister port 29 is thereby in fluid communication with the tank port 27 via the valve chamber 26.

The solenoid assembly 22 is connected to the housing 21 opposite the outer wall 25 and closes an open end of the housing 21 such that the solenoid assembly 22 is adjacent to and extends into a side of the valve chamber 26. The solenoid assembly 22 includes a generally cylindrical frame 31. A first plate 32 is disposed at one end of the frame 31 and a second plate 33 is disposed at an opposite end of the frame 31. A spool 34 is disposed within the frame 31 and sandwiched between the first plate 32 and the second plate 33. A conductive coil 35 is wound around the spool 34 and is electrically connected to an electric terminal 47 that extends from the subassembly of the spool 34 and coil 35. The spool 34 includes a tubular portion 36 that defines a central cylindrical opening 37 within the solenoid assembly 22 that is colinear with a central cylindrical opening 38 formed in the second plate 33. The walls of the central cylindrical openings 37, 38 may be lined with a bushing 39. A stationary core 40 is connected to or integrally formed with the first plate 32. The stationary core 40 extends into the central cylindrical opening 37 inside of the bushing 39. A moveable plunger 41 is disposed in the central cylindrical openings 37, 38 of the spool 34 and second plate 33. The spool 34 and coil 35 thereby encircle both the stationary core 40 and the moveable plunger 41. The moveable plunger 41 is slidable within the bushing 39. The moveable plunger 41 has a first end 42 and a second end 43 that is longitudinally opposed to the first end 42. A primary spring 44 in the form of a coil compression spring is disposed between and in urged engagement with the stationary core 40 and the first end 42 of the moveable plunger 41. An impact dampener in the form of a magnetic break ring 77 controls the magnetic air gap between the moveable plunger 41 and the stationary core 40. The magnetic break ring 77 prevents against metal-to-metal contact noise between the moveable plunger 41 and the stationary core 40 and also prevents against magnetic lock so that the moveable plunger 41 does not stay attached to the stationary core 40 with residual voltage from the controller used to energize and de-energize the solenoid assembly 22 via the electric terminal 47. The second end 43 of the moveable plunger 41 extends outwardly from the second plate 33 through the central cylindrical opening 38 in the second plate 33. A generally cylindrical, elongated alignment pin 45 extends from the second end 43 of the moveable plunger 41 and into the valve chamber 26. An overmold 46 may cover and generally encase the components of the solenoid assembly 22.

The valve member 23 is disposed in the valve chamber 26 of the housing 21 and is adjacent the second end 43 of the moveable plunger 41. The valve member 23 is mounted on a portion of the alignment pin 45 such that the alignment pin extends through the center of the valve member 23 and into the canister port 29. The valve member 23 includes a generally tubular main body 48 having a first portion 49 connected to a second portion 50 by a shoulder 51 that extends between the first portion 49 and the second portion 50. The first portion 49 of the main body 48 has a smaller outer diameter than the second portion 50 such that the main body 48 is wider at the second portion 50. The first portion 49 terminates in a first annular rim that defines a first stage valve surface 52, and the second portion 50 terminates in a second annular rim that is opposite the first annular rim and defines an opposite second stage valve surface 53. A first sealing ring 54 is disposed along the circumference of the first annular rim defining the first stage valve surface 52, and similarly a second sealing ring 55 is disposed along the circumference of the second annular rim defining the second stage valve surface 53. The first sealing ring 54 and the second sealing ring 55 are attached/bonded to the valve member 23 and preferably are made of a complaint material such as a rubber material or similar elastic or elastic-like material.

An end surface of the moveable plunger 41 at the second end 43 thereof defines a first stage valve seat 56. The first stage valve seat 56 is rigid. The first stage valve surface 52 of the valve member 23, including the first sealing ring 54, is seated on the first stage valve seat 56 in a closed disposition, and is lifted away from the first stage valve seat in an open disposition. An inner surface of the wall 25 of the housing 21 surrounding and adjacent the transfer passage 30 defines a second stage valve seat 57. The second stage valve seat 57 is also rigid. The second stage valve surface 53 of the valve member 23, including the second sealing ring 55, is seated on the second stage valve seat 57 in a closed disposition, and is lifted away from the first stage valve seat in an open disposition. The first sealing ring 54 and the second sealing ring 55, being made of a compliant material, seals against the rigid first stage valve seat 56 and rigid second stage valve seat 57, respectively, in the closed dispositions.

The valve member 23 further includes a tubular guide portion 58 connected to an inner annular surface 59 of the main body 48 by a plurality of arms 60, for example, four arms. The inner annular surface 59 is adjacent the shoulder 51 and at an inner end of the first portion 49. The alignment pin 45 of the solenoid assembly 22 extends through the guide portion 58 and thereby the valve member 23 is kept in proper alignment with the moveable plunger 41 and the second stage valve seat 57.

The valve member 23 also includes a plurality of fins 61 extending from the shoulder 51 and beyond the annular rim defining the first stage valve surface 52 of the first portion 49 of the main body 48. For example, the valve member 23 may include two, three, or four fins 61. The fins overlap a portion of the second end 43 of the moveable plunger 41 and guide relative movement between the valve member 23 and moveable plunger 41. The fins 61 are disposed around the circumference of the first portion 49 of the main body 48 and are spaced from each other in the circumferential direction such that there is a gap between adjacent fins 61 for air/vapor flow. Each fin has a generally rectangular shape and is cantilevered relative to the shoulder 51. Alternatively, the fin extending from the shoulder may be one continuous fin around the circumference of the shoulder with one or more radially disposed openings for air/vapor flow.

An inner shoulder surface of the main body 48 of the valve member 23 defines an internal spring seat 62. A secondary spring 63 in the form of a coil compression spring is engaged with the internal spring seat 62 of the valve member 23 opposite the moveable plunger 41 of the solenoid assembly 22. In these embodiments of the fuel tank isolation valve 20, the fuel tank isolation valve includes a retainer 64 that is fixed on the alignment pin 45. The secondary spring 63 is retained by the retainer 64 such that the secondary spring 63 is disposed between and in urged engagement with the valve member 23 and the retainer 64. The retainer has a generally tubular central portion 65 and a plurality of wings 66 that extend outwardly from the central portion 65. The retainer 64, for example, may include five wings 66. The wings are disposed around the circumference of the central portion 65 and are spaced from each other in the circumferential direction such that there is a gap between adjacent wings 66 that allows for flow of air/vapor therethrough. It should be understood, however, that the retainer may have any suitable shape that provides support and retention of the secondary spring. For example, while the retainer 64 is shown as having a spider-like shape, the retainer alternatively may have a circular disk shape with through holes therein, or the retainer may have a honeycomb shape.

The fuel tank isolation valve 20 further includes a pressure relief valve 67 disposed in a pressure relief chamber 68 that is adjacent the housing 21 and the canister port 29. A first relief passage 69 in the form of an opening in the wall 25 of the housing 21 connects the valve chamber 26 to the pressure relief chamber 68. A second relief passage 70 in the form of an opening in the canister port 29 connects the pressure relief chamber 68 to the canister port 29. The tank port 27 and valve chamber 26 are thereby in fluid communication with the canister port 29 via the first relief passage 69, the pressure relief chamber 68, and the second relief passage 70 in an open disposition of the pressure relief valve 67. More particularly, the pressure relief valve includes a poppet 71 having a stem 72 and a head 73. The stem 72 is received in a tubular portion of a relief valve retainer 74 that closes an open end of the pressure relief chamber 68. A relief valve spring 75 is disposed between with the relief valve retainer 74 and the head 73 of the poppet 71. A relief valve seat 76 surrounds the first relief passage 69 on an inner wall of the pressure relief chamber 68, and the head 73 of the poppet 71 is urged into engagement with the relief valve seat 76 by the relief valve spring 75 in a closed disposition of the pressure relief valve 67.

Figure 10:
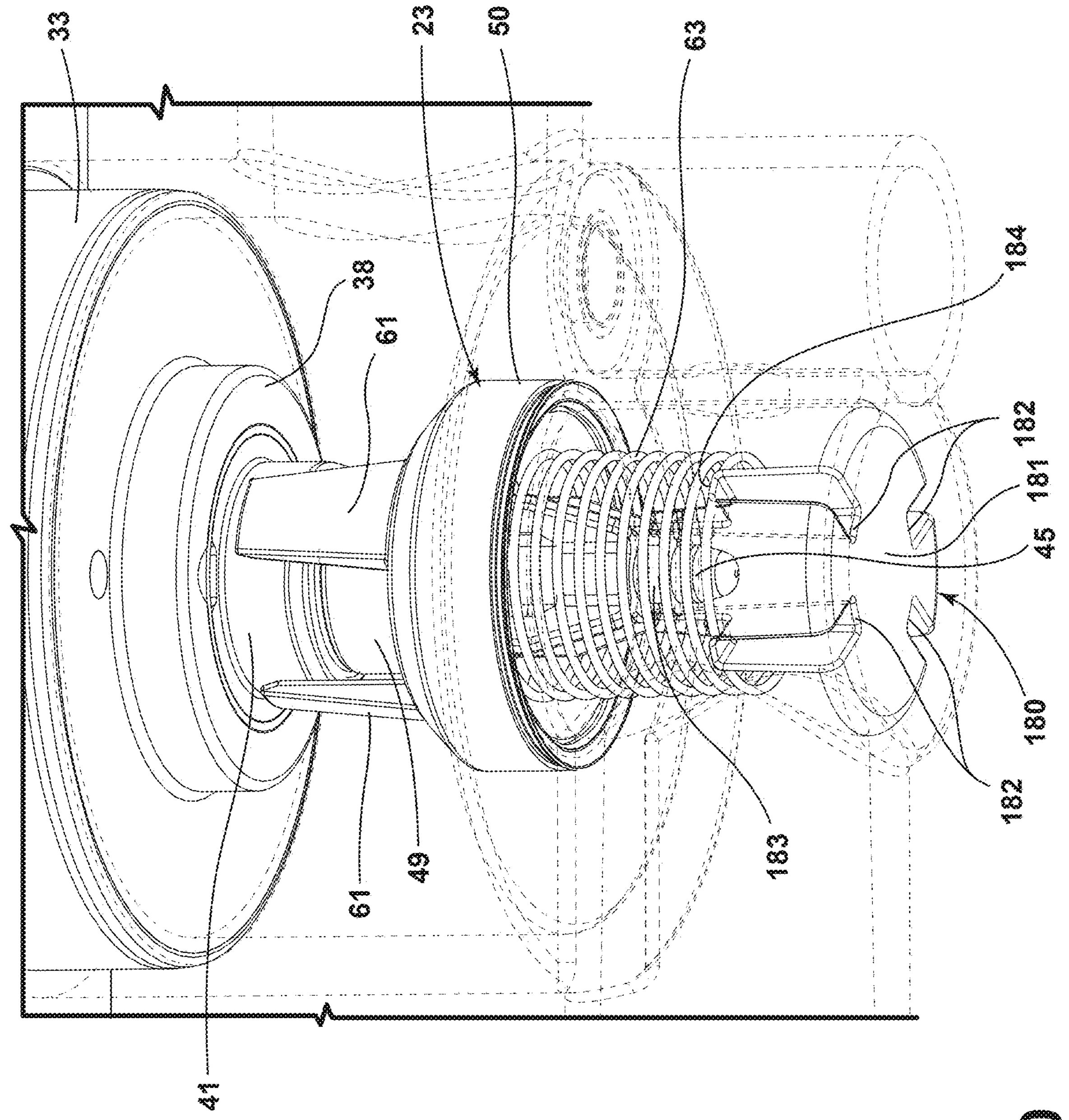
FIG. 10 is a perspective view of an internal portion of the fuel tank isolation valve of FIG. 7.

Turning to FIGS. 7-10, in alternative embodiments the fuel tank isolation valve 120 does not include the retainer 64. Instead, in such embodiments, the secondary spring 63 is seated on a pedestal 180 that extends from a surface 181 of the canister port 29 that is aligned with the valve member 23 and the moveable plunger 41. The pedestal 180 is internal to the housing 21 and is shown in the sectional views of FIGS. 7 and 9, but is not visible in the exploded view of FIG. 8. The pedestal 180 is also shown in FIG. 10 in which the walls of the housing are shown partially in phantom to reveal the inner structure. The pedestal 180 is formed by a plurality of feet 182 that are mounted on or integral with the surface 181 of the canister port 29. For example, the pedestal 180 may include four feet 182. A leg 183 extends from an inner edge of each of the feet 182, and a support surface 184 is formed on an end of each foot 182 adjacent the leg 183. An end of the secondary spring 63 is supported on the support surfaces 184 of the feet 182, and the legs 183 are disposed inside of the secondary spring 63. The legs 183 maintain the alignment of the secondary spring 63 with the valve member 23 and prevent wayward radially shifting of the secondary spring 63 so that the secondary spring is securely held on the support surfaces 184 of the feet 182. Further, in the embodiments of the fuel tank isolation valve 120, a retainer clip 185 is disposed on the free end of the alignment pin 45. The retainer clip 185 limits a distance of movement between the alignment pin 45 and the valve member 23 and also can prevent the valve member 23 and alignment pin 45 from becoming decoupled. Further, the retainer clip 185 moves axially with movement of the moveable plunger 41 and alignment pin 45 until it bottoms out and contacts a positive stop surface on the bottom of the tubular guide portion 58 of the valve member 23 (in the "first stage disposition" described below). Other than these features, the fuel tank isolation valve 120 has the same features as the fuel tank isolation valve 20, those same features being shown by the same reference numbers in FIGS. 7-10 as in FIGS. 2-6.

Figure 11:
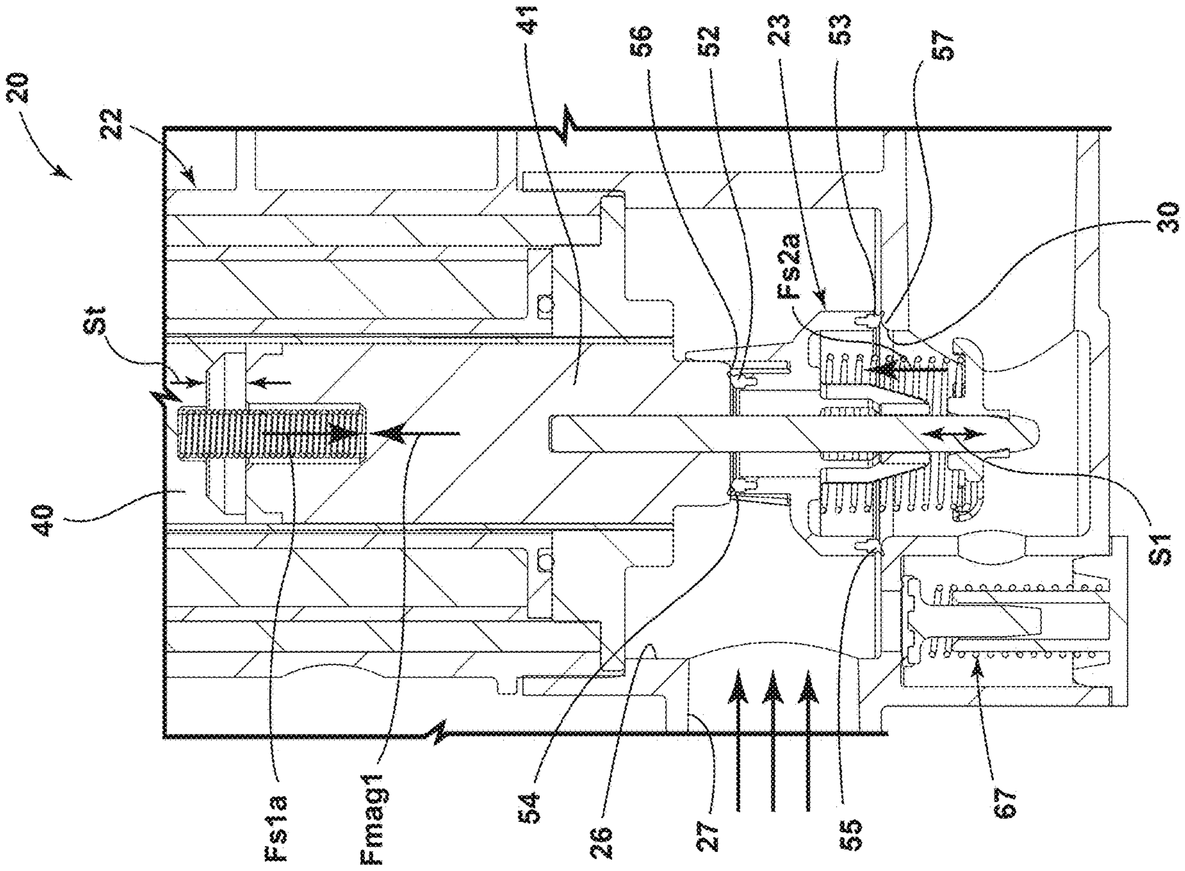
FIG. 11 is a sectional view of a portion of the fuel tank isolation valve of FIG. 2 illustrating a closed disposition of the valve.

Turning next to FIG. 11 and with reference by example to the embodiments of the fuel tank isolation valve 20, when no control voltage is applied to the solenoid 22 (and hence no current is delivered), the fuel tank isolation valve 20 is in a de-energized/deactivated state and a closed disposition. The first stage valve surface 52 of the valve member 23, including the first sealing ring 54, is seated on the first stage valve seat 56 of the moveable plunger 41, and the second stage valve surface 53 of the valve member 23, including the second sealing ring 55, is seated on the second stage valve seat 57. In this closed disposition, the fuel tank isolation valve 20 seals the fuel tank by preventing fuel vapors (shown by arrows) that enter the valve chamber 26 through the tank port 27 the from passing through the valve member 23 and transfer passage 30. Thus, the flow rate through the fuel tank isolation valve 20 is zero. Further, in the disposition shown in FIG. 10, the vapor pressure in the fuel tank is within an acceptable range, and thus the pressure relief valve 67 remains closed since the pressure of the fuel vapor entering the valve chamber 26 is not great enough to unseat the pressure relief valve 67, of which opening is described in detail below. The distance between the stationary core 40 and the moveable plunger 41 separated by the primary spring 44 is a distance St, which is the total allowable travel of the moveable plunger 41 relative to the stationary core 40.

Figure 12:
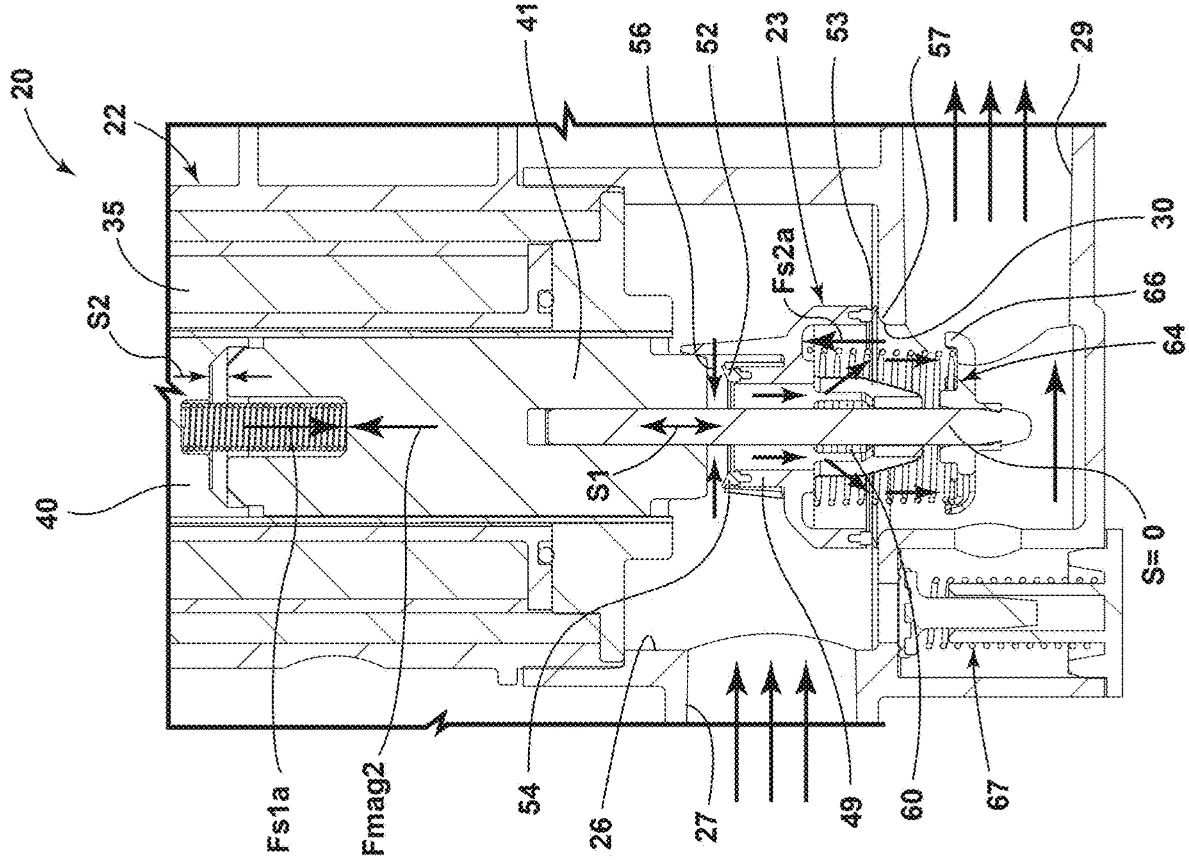
FIG. 12 is a sectional view of a portion of the fuel tank isolation valve of FIG. 2 illustrating a first stage open disposition of the valve.

With reference next to FIG. 12, a certain predetermined operating control voltage is applied to the solenoid 22 via the electrical terminal 47 and resultant current is delivered to the coil 35. The application of voltage to the coil 35 generates a magnetic force that is sufficient to move the moveable plunger 41 away from the valve member 23 and towards the stationary core 40, while the retainer 64 on the alignment pin 45 moves axially toward the valve member 23 until the retainer 64 contacts the positive stop surface on the bottom of the tubular guide portion 58 of the valve member 23. The moveable plunger 41 with the alignment pin 45 and attached retainer 64 thereby function as the valve armature. Movement of the moveable plunger 41 towards the stationary core 40 compresses the primary spring 44 a distance S1. The distance between the moveable plunger 41 and the stationary core 40 is thus a distance S2. Movement of the moveable plunger 41 unseats the first stage valve surface 52 of the valve member 23 from the moveable plunger 41, and the distance the first stage valve seat 56 of the moveable plunger 41 moves away from the first stage valve surface 52 is a distance S1. The distance St (see above) is equal to the sum of the distance S1 and the distance S2. Stated differently, the distance S2 is equal to St minus S1, which is the resultant magnetic air gap between the moveable plunger 41 and the stationary core 40. The second stage valve surface 53 of the valve member 23 remains seated on the second stage valve seat 57. Due to the first stage of the valve 20 being relatively smaller than the second stage of the valve 20, the amount of magnetic force required to open the first stage of the valve is relatively small. Opening of the first stage of the valve member 23 to an open disposition allows for flow of fuel vapor through a secondary, internal flow path through the valve member 23 from the tank port 27 and into the canister port 29 so that the fuel vapors may pass to the evaporative emissions canister. This state can be used, for example, during refueling of the fuel tank. As shown by arrows, the flow path of fuel vapors in this first stage disposition runs from the tank port 27 into the valve chamber 26, and through the gaps between the fins 61 of the valve member 23. The flow path continues through the opened space between the moveable plunger 41 and the first stage valve surface 52 of the valve member 23 and into the void space inside of the valve member 23. Within the valve member 23, the flow path runs from the inside of the first portion 49 of the valve member 23 past the gaps between the arms 60 to the inside of the second portion 50 of the valve member 23. The flow path then exits the valve member 23 through the transfer passage 30 and continues past the gaps between the wings 66 of the retainer 64 in the canister port 29, and then out of the canister port 29 to exit the fuel tank isolation valve 20. The operation and flow path are the same in the embodiments of the fuel tank isolation valve 120, except that the retainer is not present in the flow path, and the retainer clip 185 (rather than the retainer 64 of the first embodiment 20) contacts the positive stop surface of the valve member 23 as described above.

Figure 13:
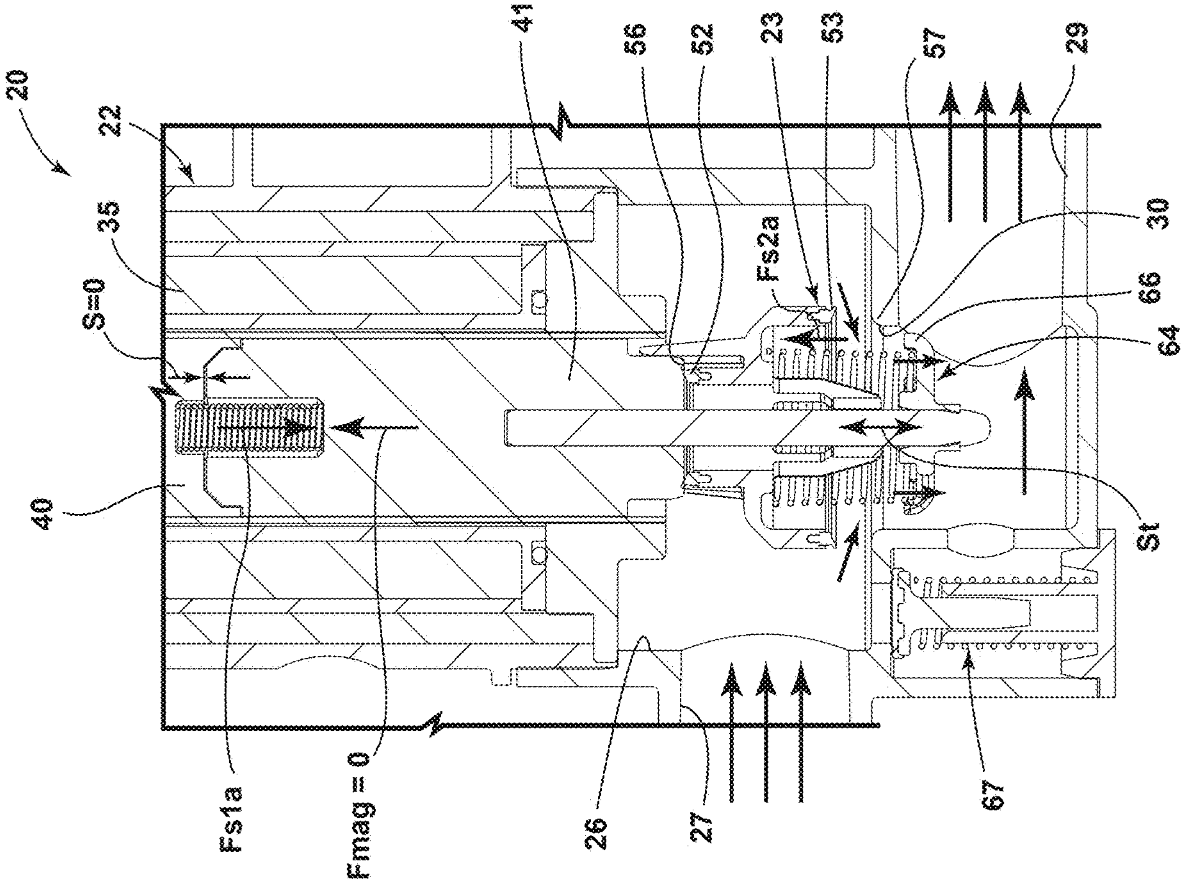
FIG. 13 is a sectional view of a portion of the fuel tank isolation valve of FIG. 2 illustrating a second stage open disposition of the valve.

Turning next to FIG. 13, voltage is maintained to the solenoid 22 and resultant current is delivered to the coil 35 in order to generate a magnetic force that is sufficient to move the moveable plunger 41 the remaining distance S2 towards the stationary core 40, which compresses the primary spring 44 the distance St and changes the disposition of the valve member 23 from the first stage open disposition to a second stage open disposition. The magnetic force Fmag2 required to open the second stage of the valve member 23 is similar to or less than the magnetic force Fmag1 required to open the first stage of the valve member 23. Particularly, after the first stage opening of the valve 20, the pressure differential between the tank port 27 and the canister port 29 decreases so that the force required to open the second stage of the valve 20 is significantly lower than what would be required under the initial tank pressure condition, or if the valve were to open all in one stage (distance St). Thus, the present two-stage valve requires less energy and fewer coil turns than a single stage valve in which the pneumatic forces on the single valve seat area are high and the magnetic force required for valve opening are greater. In the second stage open disposition, the first stage valve surface 52 of the valve member 23 is reseated on the first stage valve seat 56 of the moveable plunger 41, while the second stage valve surface 53 unseats and moves away from the second stage valve seat 57. Opening of the second stage of the valve member 23 to an open disposition allows for the flow of fuel vapor through a primary, external flow path past the valve member 23 into the canister port 29 so that fuel vapors may pass to the evaporative emissions canister. This state can also be used, for example, during refueling of the fuel tank. As shown by arrows, the flow path of fuel vapors in this second stage runs from the tank port 27 into the valve chamber 26, past the second stage valve surface 53 of the valve member 23, through the transfer passage 30 and past the gaps between the wings 66 of the retainer 64 in the canister port 29, and then out of the canister port 29 to exit the fuel tank isolation valve 20. The operation and flow path are the same in the embodiments of the fuel tank isolation valve 120, except that the retainer is not present in the flow path.

Figure 14:
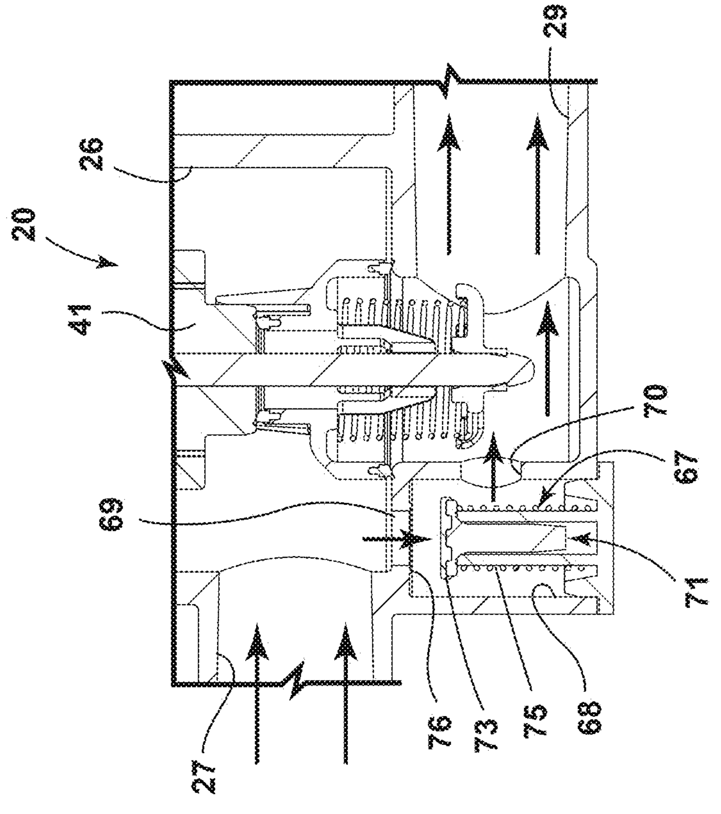
FIG. 14 is a sectional view of a portion of the fuel tank isolation valve of FIG. 2 illustrating a pressure relief valve open disposition of a pressure relief valve of the fuel tank isolation valve.

With reference now to FIG. 14, in an over-pressure condition in which the pressure in the sealed fuel tank raises to a level that exceeds a predetermined upper threshold, the fuel vapor pressure in the valve chamber 26 via flow of fuel vapor from the tank port 27 becomes greater than the opening force required to open the pressure relief valve 67. As such, the vapor pressure overcomes the spring force of the relief valve spring 75, and the head 73 of the poppet 71 unseats from the relief valve seat 76 into an open disposition. As shown by arrows, the fuel vapor may then flow from the tank port 27 and valve chamber 26 through the first relief passage 69 into the pressure relief chamber 68, then through the second relief passage 70 into the canister port 29 and out of the fuel tank isolation valve 20 and to the evaporative emissions canister. When the vapor pressure in the fuel tank has been relieved and lowered below the acceptable, predetermined maximum, the relief valve spring 75 returns the head 73 of the poppet 71 to the relief valve seat 76, whereby the pressure relief valve 67 is moved from the open disposition back to a closed disposition. The operation and flow path are the same in the embodiments of the fuel tank isolation valve 120.

Figure 15:
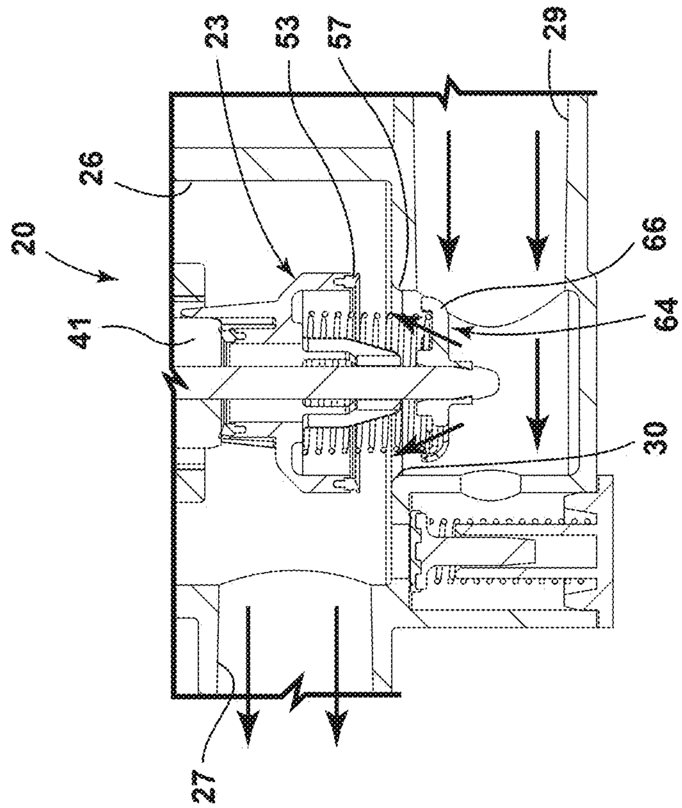
FIG. 15 is a sectional view of a portion of the fuel tank isolation valve of FIG. 2 illustrating a vacuum-pressure relief, open disposition of the fuel tank isolation valve.

Turning finally to FIG. 15, in an over-vacuum/under-pressure condition in which the pressure in the sealed fuel tank drops to a level that is below a predetermined lower threshold, a pressure differential force is generated across the valve member 23 that is sufficient to move the moveable plunger 41 towards the stationary core (see other views) overcoming the spring forces acting on the valve member 23 and moveable plunger 41 that together function as the valve armature. The solenoid 22 is de-energized in the under-pressure condition, and the movement of the valve armature is entirely due to the pressure differential. Due to the low pressure in the valve chamber 26, movement of the moveable plunger 41 causes the second stage valve surface 53 of the valve member 23 to unseat from the second stage valve seat 57, thereby opening the transfer passage 30. This allows fuel vapor stored in the evaporative emissions canister to travel through the canister port 29, past the gaps between the wings 66 of the retainer 64, through the transfer passage 30 and past the second stage valve surface 53 of the valve member 23, into the valve chamber 26 and through the tank port 27 to exit the fuel tank isolation valve 20 and travel to the fuel tank. When the vapor pressure in the fuel tank has reached an acceptable, predetermined minimum, the fuel tank isolation valve 20 returns to the resting, closed disposition to thereby again seal the fuel tank. The operation and flow path are the same in the embodiments of the fuel tank isolation valve 120, except that the retainer is not present in the flow path.

It is to be understood that the appended claims are not limited to express and particular compounds, compositions, or methods described in the detailed description, which may vary between particular embodiments that fall within the scope of the appended claims. With respect to any Markush groups relied upon herein for describing particular features or aspects of various embodiments, different, special, and/or unexpected results may be obtained from each member of the respective Markush group independent from all other Markush members. Each member of a Markush group may be relied upon individually and or in combination and provides adequate support for specific embodiments within the scope of the appended claims.

Further, any ranges and subranges relied upon in describing various embodiments of the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language that defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements by ordinal terms, for example "first," "second," and "third," are used for clarity, and are not to be construed as limiting the order in which the claim elements appear. Any reference to claim elements in the singular, for example, using the articles "a," "an," "the" or "said," is not to be construed as limiting the element to the singular.

What is claimed is:

1. A fuel tank isolation valve for an evaporative emissions control system, the fuel tank isolation valve comprising:

a housing having an outer wall defining an internal valve chamber therein, and a transfer passage formed in a portion of the outer wall;

a canister port connected to the housing;

a tank port connected to the housing, the tank port being in selective fluid communication with the canister port via the valve chamber and transfer passage;

a solenoid assembly connected to the housing, the solenoid assembly including a stationary core, a moveable plunger having a first end and a second end longitudinally opposed to the first end, the first end being adjacent the stationary core, a coil that encircles the stationary core and the moveable plunger, the coil actuating the moveable plunger, a primary spring disposed between the stationary core and the moveable plunger, and an alignment pin extending from the second end of the moveable plunger;

a valve member disposed in the valve chamber, the valve member being mounted on the alignment pin, the valve member including a first stage valve surface and an opposite second stage valve surface, the first stage valve surface being seated on an end surface of the moveable plunger at the second end in a closed disposition, the second stage valve surface being seated on an inner surface of the wall of the housing in a closed disposition, the inner surface surrounding the transfer passage; and a secondary spring engaged with the valve member opposite the moveable plunger.

2. The fuel tank isolation valve of claim 1, further comprising a pedestal extending from a surface of the canister port, wherein the secondary spring is seated on the pedestal such that the secondary spring is disposed between the valve member and the pedestal.

3. The fuel tank isolation valve of claim 1, further comprising a retainer mounted on the alignment pin, wherein the secondary spring is retained by the retainer such that the secondary spring is disposed between the valve member and the retainer.

4. The fuel tank isolation valve of claim 1, wherein the valve member includes a generally tubular main body having a first portion connected to a second portion by a shoulder, the first portion terminating in an annular rim defining the first stage valve surface, and the second portion terminating in an opposite annular rim defining the second stage valve surface.

5. The fuel tank isolation valve of claim 4, wherein an inner shoulder surface of the main body defines an internal spring seat, and the secondary spring is seated on the internal spring seat.

6. The fuel tank isolation valve of claim 4, wherein the first portion of the main body has a smaller diameter than the second portion of the main body.

7. The fuel tank isolation valve of claim 4, wherein the valve member includes a tubular guide portion connected to an inner surface of the main body adjacent the shoulder, the alignment pin extending through the guide portion.

8. The fuel tank isolation valve of claim 4, wherein the valve member includes one or more fins extending from the shoulder and beyond the annular rim of the first portion of the main body.

9. The fuel tank isolation valve of claim 8, wherein the one or more fins overlap a portion of the moveable plunger.

10. The fuel tank isolation valve of claim 8, wherein the valve member includes a plurality of fins circumferentially disposed and spaced around the first portion of the main body.

11. The fuel tank isolation valve of claim 4, including a first sealing ring on the annular rim defining the first stage valve surface, and a second sealing ring on the opposite annular rim defining the second stage valve surface.

12. The fuel tank isolation valve of claim 1, further including a pressure relief chamber, and a pressure relief valve disposed in the pressure relief chamber.

13. The fuel tank isolation valve of claim 12, further including a first relief passage connecting the valve chamber and the pressure relief chamber, and a relief valve seat surrounding the first relief passage, wherein the pressure relief valve includes a poppet seated on the relief valve seat in a closed disposition.

14. The fuel tank isolation valve of claim 13, further including a second relief passage connecting the pressure relief chamber and the canister port, wherein the tank port and the valve chamber are in fluid communication with the canister port via the first relief passage, the pressure relief chamber, and the second relief passage in an open disposition of the pressure relief valve.

15. The fuel tank isolation valve of claim 1, wherein the valve member is operable between the closed disposition, a first stage open disposition, and a second stage open disposition, wherein activation of the coil draws the moveable plunger toward the stationary core and unseats the first stage valve surface of the valve member from the moveable plunger while the second stage valve surface remains seated, and maintained activation of the coil draws the moveable plunger closer to the stationary core and unseats the second stage valve surface while the first stage valve surface becomes seated on the moveable plunger.

16. The fuel tank isolation valve of claim 1, wherein in a first stage open disposition of the valve, the valve comprises a fuel vapor flow path from the tank port into the valve chamber, past the first stage valve surface of the valve member, through the valve member and transfer passage, and into the canister port.

17. The fuel tank isolation valve of claim 1, wherein in a second stage open disposition of the valve, the valve comprises a fuel vapor flow path from the tank port into the valve chamber, past the second stage valve surface of the valve member, and through the transfer passage into the canister port.

18. A method of operating a fuel tank isolation valve, the method comprising the steps of:

providing the fuel tank isolation valve of claim 1;

applying a control voltage to the coil of the solenoid assembly, wherein the valve member moves from a closed disposition to a first stage open disposition such that the moveable plunger is drawn toward the stationary core and unseats the first stage valve surface of the valve member from the moveable plunger while the second stage valve surface remains seated; and maintaining application of the control voltage to the coil of the solenoid assembly, wherein the valve member moves from the first stage open disposition to a second stage open disposition such that the moveable plunger is drawn closer to the stationary core and unseats the second stage valve surface while the first stage valve surface becomes seated on the moveable plunger.

19. An evaporative emission control system for a vehicle, the system comprising:

a fuel tank;

an evaporative emissions canister; and the fuel tank isolation valve of claim 1, wherein the fuel tank isolation valve is connected between the fuel tank and the evaporative emissions canister.

* * * * *